US011591470B2

(12) United States Patent
Toya et al.

(10) Patent No.: US 11,591,470 B2
(45) Date of Patent: Feb. 28, 2023

(54) SILICONE COMPOSITION

(71) Applicant: SHIN-ETSU CHEMICAL CO., LTD., Tokyo (JP)

(72) Inventors: Wataru Toya, Annaka (JP); Keita Kitazawa, Annaka (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 454 days.

(21) Appl. No.: 16/961,985

(22) PCT Filed: Jan. 8, 2019

(86) PCT No.: PCT/JP2019/000172
§ 371 (c)(1),
(2) Date: Jul. 14, 2020

(87) PCT Pub. No.: WO2019/138991
PCT Pub. Date: Jul. 18, 2019

(65) Prior Publication Data
US 2021/0079221 A1 Mar. 18, 2021

(30) Foreign Application Priority Data
Jan. 15, 2018 (JP) .............................. JP2018-004490

(51) Int. Cl.
C08G 77/12 (2006.01)
C08L 83/04 (2006.01)
C08G 77/08 (2006.01)
C08G 77/14 (2006.01)
C08G 77/20 (2006.01)
C08K 3/08 (2006.01)
C08K 3/22 (2006.01)
C08K 5/14 (2006.01)

(52) U.S. Cl.
CPC .............. C08L 83/04 (2013.01); C08G 77/08 (2013.01); C08G 77/12 (2013.01); C08G 77/14 (2013.01); C08G 77/20 (2013.01); C08K 3/08 (2013.01); C08K 3/22 (2013.01); C08K 5/14 (2013.01); C08K 2003/0812 (2013.01); C08K 2003/2296 (2013.01); C08L 2203/20 (2013.01); C08L 2205/035 (2013.01)

(58) Field of Classification Search
CPC ........ C08G 77/12; C08G 77/20; C08G 77/18; C08L 83/04; C08K 5/14; C08K 5/0812; B01J 23/40
See application file for complete search history.

(56) References Cited
U.S. PATENT DOCUMENTS 4,539,357 A * 9/1985 Bobear ............... C08L 83/04
528/31
5,122,562 A 6/1992 Jeram et al.
6,387,487 B1 5/2002 Greenberg et al.

2003/0049466 A1 3/2003 Yamada et al.
2007/0149834 A1 6/2007 Endo et al.
2008/0254247 A1 10/2008 Asaine
2011/0024675 A1 2/2011 Endo et al.
2012/0119137 A1 5/2012 Tsuji et al.
2016/0068732 A1 3/2016 Kitazawa
2017/0349801 A1 12/2017 Wu
2017/0355804 A1 12/2017 Fujisawa et al.

FOREIGN PATENT DOCUMENTS

| EP | 0 939 115 A1 | 9/1999 |
| JP | 4-283265 A | 10/1992 |
| JP | 2938428 B1 | 8/1999 |
| JP | 2938429 B1 | 8/1999 |
| JP | 2004-506778 A | 3/2004 |
| JP | 3580366 B2 | 10/2004 |
| JP | 3952184 B2 | 8/2007 |
| JP | 2008-260798 A | 10/2008 |
| JP | 2009-209165 A | 9/2009 |
| JP | 2010-13495 A | 1/2010 |
| JP | 2010-189594 A | 9/2010 |
| JP | 4572243 B2 | 11/2010 |
| JP | 4656340 B2 | 3/2011 |

(Continued)

OTHER PUBLICATIONS

Taiwanese Office Action and Search Report for Taiwanese Application No. 108101332, dated Nov. 8, 2021.
International Search Report (PCT/ISA/210) issued PCT/JP2019/000172 dated Apr. 16, 2019.
Written Opinion (PCT/ISA/237) issued in PCT/JP2019/000172 dated Apr. 16, 2019.
Extended European Search Report for European Application No. 19738958.8, dated Sep. 15, 2021.

* cited by examiner

Primary Examiner — Kuo Liang Peng
(74) Attorney, Agent, or Firm — Birch, Stewart, Kolasch & Birch, LLP

(57) ABSTRACT

Provided is a silicone composition that has high thermal conductivity and favorable adhesion. A silicone composition that contains (A) 50-99.9 parts by mass of an organopolysiloxane that has at least two aliphatic unsaturated hydrocarbon groups per molecule thereof and has a kinematic viscosity of 60-100,000 mm$^2$/s at 25° C., (B) 0.1-50 parts by mass of a silicone resin that has at least one aliphatic unsaturated hydrocarbon group per molecule thereof (provided that the total of components (A) and (B) is 100 parts by mass), (C) an organohydrogen polysiloxane, (D) 0.01-10.0 parts by mass of an organic peroxide that has a ten-hour half-life temperature of at least 40° C. per 100 total parts by mass of components (A) and (B), and (E) 100-3,000 parts by mass of a thermally conductive filler that has a thermal conductivity of at least 10 W/(m·° C.) per 100 total parts by mass of components (A) and (B).

5 Claims, No Drawings

(56) References Cited

FOREIGN PATENT DOCUMENTS

| | | |
|---|---|---|
| JP | 4913874 B2 | 4/2012 |
| JP | 4917380 B2 | 4/2012 |
| JP | 2012-96361 A | 5/2012 |
| JP | 2012-102283 A | 5/2012 |
| JP | 4933094 B2 | 5/2012 |
| TW | 201623455 A | 7/2016 |
| WO | WO 2016/103654 A1 | 6/2016 |

SILICONE COMPOSITION

TECHNICAL FIELD

The present invention relates to a silicone composition. More specifically, the invention relates to a highly heat-conductive silicone composition, particularly a silicone composition which has good adhesive properties even when it contains a large amount of heat-conductive filler.

BACKGROUND ART

It is widely known that semiconductor devices generate heat during use and undergo a decline in performance as a result. Various heat-dissipating techniques are used as means for resolving this problem. Generally, heat dissipation is carried out by placing a cooling member (a heat sink or the like) near a heat-generating member and, with both set in close contact, efficiently removing heat from the cooling member. At this time, if there is a gap between the heat-generating member and the cooling member, the thermal conductivity decreases due to the presence therebetween of air, which has a poor ability to conduct heat, and so the temperature of the heat-generating member fails to decline to a sufficient degree. In order to prevent this from happening, use is made of a heat-dissipating material that has a good thermal conductivity and the ability to conform to the surfaces of the members, such as a liquid heat-dissipating material or a heat-dissipating sheet (Patent Documents 1 to 13).

Among heat-dissipating materials, there are heat-dissipating materials which have been imparted with adhesiveness so as to firmly bond a semiconductor chip to a heat sink. The reason is that, when a semiconductor chip and a heat sink are not fully bonded to each other by an intervening heat-dissipating material, the heat-dissipating performance may decline due to the presence of air therebetween. Firmly bonding between the semiconductor chip and the heat sink with a heat-dissipating material is thus important. However, in order to increase the thermal conductivity of the heat-dissipating material, it is necessary to include a large amount of heat-conductive filler. When a large amount of heat-conductive filler is included in a composition, this has the drawback of lowering the adhesiveness of the resulting cured composition. At a lower adhesiveness, there is a possibility that the cured composition will be unable to conform to strain and shearing of the semiconductor chip during use and delamination will arise, leading to a decrease in performance. Patent Document 11 mentions a heat-conductive silicone composition that includes as essential ingredients an alkenyl group-containing organopolysiloxane, a silicone resin, an alkenyl group-containing hydrolyzable organopolysiloxane, a heat-conductive filler, an organohydrogenpolysiloxane, a platinum-based catalyst and a regulator. Patent Document 12 states that it is possible to provide a silicone composition which, compared to the preexisting art, has a high thermal conductivity and a good adhesiveness. Patent Document 13 describes a heat-conductive silicone composition which includes as the curing agent a peroxide having a ten hour half-life temperature of at least 80° C. but less than 130° C., and states that this composition can provide a heat-dissipating material which can easily be cured on a substrate surface having a layer of a noble metal such as gold.

PRIOR ART DOCUMENTS

Patent Documents

Patent Document 1: JP No. 2938428
Patent Document 2: JP No. 2938429
Patent Document 3: JP No. 3580366
Patent Document 4: JP No. 3952184
Patent Document 5: JP No. 4572243
Patent Document 6: JP No. 4656340
Patent Document 7: JP No. 4913874
Patent Document 8: JP No. 4917380
Patent Document 9: JP No. 4933094
Patent Document 10: JP-A 2008-260798
Patent Document 11: JP-A 2009-209165
Patent Document 12: JP-A 2012-102283
Patent Document 13: JP-A 2012-96361

SUMMARY OF INVENTION

Technical Problem

The amount of heat generated during operation in advanced semiconductor devices has been increasing in recent years. At the same time, reductions in the number of components are being carried out due to equipment miniaturization, and so there exists a desire for the development of heat-dissipating materials having a high thermal conductivity and a high adhesiveness.

It is therefore an object of the present invention to provide a silicone composition which, compared with conventional silicon compositions, has a high thermal conductivity and good adhesive properties.

Solution to Problem

The inventors have conducted extensive investigations in order to achieve this object. As a result, they have discovered that a silicone composition which has good adhesive properties even though it contains a large amount of heat-conductive filler can be provided by having the silicone composition include specific respective amounts of an aliphatic unsaturated hydrocarbon group-containing organopolysiloxane, an aliphatic unsaturated hydrocarbon group-containing silicone resin, an organohydrogenpolysiloxane having a specific structure, a specific organic peroxide and a heat-conductive filler. This discovery ultimately led to the present invention.

Accordingly, the invention provides the following silicone composition.

1. A silicone composition which includes:

(A) 50 to 99.9 parts by weight of an organopolysiloxane having at least two aliphatic unsaturated hydrocarbon groups per molecule and a kinematic viscosity at 25° C. of from 60 to 100,000 mm$^2$/s, (B) 0.1 to 50 parts by weight of a silicone resin having at least one aliphatic unsaturated hydrocarbon group per molecule (with the proviso that the combined amount of components (A) and (B) is 100 parts by weight)

(C) an organohydrogenpolysiloxane of structural formula (1) below

[Chem. 1]

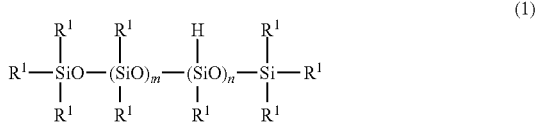

(wherein each $R^1$ is independently an alkyl group of 1 to 6 carbon atoms or a hydrogen atom, and m and n are numbers which satisfy the conditions $5.0 \leq m+n \leq 100$ and $n/(m+n) \leq 0.6$, with the proviso that the molecule has a SiH group and the $R^1$ groups are not all hydrogen atoms), (D) an organic peroxide having a ten hour half-life temperature of at least 40° C., in an amount of from 0.01 to 10 parts by weight per 100 parts by weight of components (A) and (B) combined, and (E) a heat-conductive filler having a thermal conductivity of at least 10 W/(m° C.), in an amount of from 100 to 3,000 parts by weight per 100 parts by weight of components (A) and (B) combined.

2. The silicone composition of 1, further including (F) a hydrolyzable organopolysiloxane of structural formula (2) below

[Chem. 2]

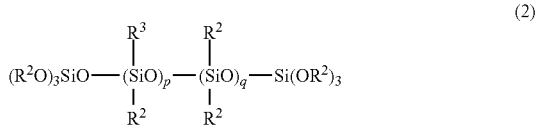

(wherein each $R^2$ is independently an alkyl group of 1 to 6 carbon atoms, $R^3$ is an alkenyl group of 2 to 6 carbon atoms, and p and q are numbers which satisfy the condition $5.0 \leq p+q \leq 100$), in an amount of from 1 to 50 parts by weight per 100 parts by weight of components (A) and (B) combined.

3. The silicone composition of 1 or 2, further including (G) a hydrolyzable organopolysiloxane of general formula (3) below

[Chem. 3]

(wherein each $R^4$ is independently an alkyl group of 1 to 6 carbon atoms, and r is an integer from 5 to 100), in an amount of from 1 to 50 parts by weight per 100 parts by weight of components (A) and (B) combined.

4. The silicone composition of any of 1 to 3, further including (H) an organohydrogenpolysiloxane having at least one functional group selected from epoxy groups, (meth)acryloxy groups, alkoxysilyl groups and carbonyl groups.

5. The silicone composition of any of 1 to 4, further including (I) an effective amount of a platinum group metal catalyst and (J) a reaction regulator in an amount of from 0.05 to 5.0 parts by weight per 100 parts by weight of components (A) and (B) combined.

Advantageous Effects of Invention

The silicone composition of the invention is capable of having good adhesive properties even though it contains a large amount of heat-conductive filler.

DESCRIPTION OF EMBODIMENTS

The invention is described in detail below.

[Component (A)]

Component (A) is an organopolysiloxane having at least two aliphatic unsaturated hydrocarbon groups per molecule and a kinematic viscosity at 25° C. of from 60 to 100,000 mm²/s. One such organopolysiloxane may be used alone or two or more may be used in suitable combination. The aliphatic unsaturated hydrocarbon groups are exemplified by monovalent hydrocarbon groups of preferably 2 to 8 carbon atoms, and more preferably 2 to 6 carbon atoms, which have an aliphatic unsaturated bond. Alkenyl groups having this number of carbons are preferred. Examples of alkenyl groups include vinyl, allyl, propenyl, isopropenyl, butenyl, hexenyl, cyclohexenyl and octenyl groups. Of these, vinyl groups are preferred. The aliphatic unsaturated hydrocarbon groups may be bonded either to silicon atoms at the ends of the molecular chain or to silicon atoms partway along the molecular chain, or may be bonded to both.

Organic groups other than the aliphatic unsaturated hydrocarbon groups which bond to the silicon atoms on the organopolysiloxane are exemplified by substituted or unsubstituted monovalent hydrocarbon groups of 1 to 18 carbon atoms, preferably 1 to 10 carbon atoms, and more preferably 1 to 8 carbon atoms. Examples of monovalent hydrocarbon groups include alkyl groups such as methyl, ethyl, propyl, isopropyl, butyl, isobutyl, tert-butyl, pentyl, neopentyl, hexyl, cyclohexyl, octyl, nonyl and decyl groups; aryl groups such as phenyl, tolyl, xylyl and naphthyl groups; and aralkyl groups such as benzyl, phenylethyl and phenylpropyl groups. Additional examples include groups in which some or all hydrogen atoms on the foregoing groups are substituted with halogen atoms such as fluorine, bromine or chlorine, cyano groups or the like; examples of such groups include chloromethyl, chloropropyl, bromoethyl, trifluoropropyl and cyanoethyl groups. Of these, methyl groups are preferred.

The organopolysiloxane of component (A) has a kinematic viscosity at 25° C. of from 60 to 100,000 mm²/s, and preferably from 100 to 30,000 mm²/s. At a dynamic viscosity below 60 mm²/s, the physical properties of the silicone composition decrease; at a dynamic viscosity greater than 100,000 mm²/s, the silicone composition has a poor extensibility. In this invention, the kinematic viscosity is a value measured at 25° C. with an Ubbelohde-type Ostwald viscometer (the same applies below).

The organopolysiloxane of component (A), so long as it possesses the above properties, has a molecular structure which, although not particularly limited, may be, for example, linear, branched, partially branched, or linear with cyclic structures. Of these, a linear structure in which the backbone consists of repeating diorganosiloxane units and both ends of the molecular chain are capped with triorganosiloxy groups, preferably dimethylvinylsiloxy groups, is preferred. Organopolysiloxanes with this linear structure may have branched structures or cyclic structures in some places.

The content of component (A) is from 50 to 99.9 parts by weight, and preferably from 70 to 95 parts by weight. The combined amount of components (A) and (B) is 100 parts by weight.

[Component (B)]

Component (B) is a silicone resin having at least one aliphatic unsaturated hydrocarbon group per molecule. One such silicone resin may be used alone or two or more may be used in suitable combination. Including such a silicone resin in the silicone composition markedly increases the bond strength of the cured composition.

The silicone resin of component (B) has at least one aliphatic unsaturated hydrocarbon group per molecule, the amount of the aliphatic unsaturated hydrocarbon groups being preferably from $1\times10^{-5}$ to $1\times10^{-2}$ mol/g, and more preferably from $1\times10^{-4}$ to $2\times10^{-3}$ mol/g.

The silicone resin of component (B) is preferably a silicone resin containing $SiO_{4/2}$ units (Q units), $R^5_2R^6SiO_{1/2}$ units and $R^5_3 SiO_{1/2}$ units (M units) (wherein each $R^5$ is independently a monovalent hydrocarbon group that has no aliphatic unsaturated bonds, and $R^6$ is an aliphatic unsaturated hydrocarbon group).

In the above formulas, each $R^5$ is independently a monovalent hydrocarbon group that has no aliphatic unsaturated bonds, and is exemplified by substituted or unsubstituted monovalent hydrocarbon groups which have preferably from 1 to 18 carbon atoms, more preferably from 1 to 10 carbon atoms, and even more preferably from 1 to 8 carbon atoms. Specific examples of such monovalent hydrocarbon atoms include alkyl groups such as methyl, ethyl, propyl, isopropyl, butyl, isobutyl, tert-butyl, pentyl, neopentyl, hexyl, cyclohexyl, octyl, nonyl and decyl groups; aryl groups such as phenyl, tolyl, xylyl and naphthyl groups; and aralkyl groups such as benzyl, phenylethyl and phenylpropyl groups. In addition, some or all hydrogen atoms on these groups are substituted with halogen atoms such as fluorine, bromine or chlorine, cyano groups or the like; examples include chloromethyl, chloropropyl, bromoethyl, trifluoropropyl and cyanoethyl groups. Of these, methyl groups are preferred.

$R^6$ is an aliphatic unsaturated hydrocarbon group, preferably a monovalent hydrocarbon group that has an aliphatic unsaturated bond and from 2 to 8 carbon atoms, especially from 2 to 6 carbon atoms, and is more preferably an alkenyl group. Examples of the alkenyl group include vinyl, allyl, propenyl, isopropenyl, butenyl, hexenyl, cyclohexenyl and octenyl groups. Of these, a vinyl group is preferred.

The molar ratio of $R^5_2R^6SiO_{1/2}$ units and $R^5_3 SiO_{1/2}$ units (M units) to $SiO_{4/2}$ units (Q units) is such that the ratio (M units)/(Q units) is a number from 0.1 to 3.0, preferably a number from 0.3 to 2.5, and more preferably a number from 0.5 to 2.0. At a molar ratio of M units to Q units within this range, a silicone composition having an even better adhesiveness and bond strength can be provided. In addition, the silicone resin of the invention may include $R_2SiO_{2/2}$ units (D units) and $RSiO_{3/2}$ units (T units) on the molecule insofar as doing so does not detract from the properties of the inventive composition (in these formulas, R is $R^5$ or $R^6$).

In this invention, the silicone resin of component (B) is a solid or a viscous liquid at room temperature. The average molecular weight of the silicone resin is not particularly limited. However, to enhance the physical properties of the silicone composition, this silicone resin, when dissolved in xylene to form a 50 wt % solution, has a kinematic viscosity (25° C.) that is preferably from 0.5 to 10 mm²/s, and more preferably from 1.0 to 5.0 mm²/s.

The content of component (B) is preferably from 0.1 to 50 parts by weight, and more preferably from 5 to 30 parts by weight, provided that the combined amount of components (A) and (B) is 100 parts by weight. An amount of component (B) below 0.1 part by weight is inadequate for manifesting adhesive properties; at an amount greater than 50 parts by weight, the viscosity rises and the handleability becomes difficult.

[Component (C)]

Component (C) is an organohydrogenpolysiloxane of structural formula (1) below. One such organohydrogenpolysiloxane may be used alone or two or more may be used in suitable combination.

[Chem. 4]

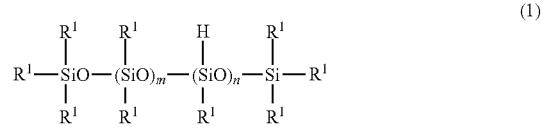

In this formula, each $R^1$ is independently an alkyl group of 1 to 6 carbon atoms or a hydrogen atom, and m and n are numbers which satisfy the conditions $5.0 \le m+n \le 100$ and $n/(m+n) \le 0.6$, with the proviso that the molecule has a SiH group and the $R^1$ groups are not all hydrogen atoms.

The organohydrogenpolysiloxane of component (C) has one or more SiH group on the molecule. In the presence of a platinum group metal catalyst, the SiH groups on the molecule undergo addition reactions with aliphatic unsaturated hydrocarbon groups in the composition, forming a crosslinked structure. The number of SiH groups on the molecule is suitably selected according to the ratios relating to m and n below and the content of component (C), but is preferably at least 2, and more preferably 3 or more.

Each $R^1$ is independently an alkyl group of 1 to 6 carbon atoms or a hydrogen atom. In formula (1), each $R^1$ is independently an alkyl group of 1 to 6 carbon atoms or a hydrogen atom. Examples of the alkyl groups include methyl, ethyl, propyl, isopropyl, butyl, sec-butyl, tert-butyl, pentyl and hexyl groups. However, the $R^1$ groups are not all hydrogen atoms.

The subscripts "m" and "n" are such that $5.0 \le m+n \le 100$, and preferably such that $10 \le m+n \le 80$. They are also such that $n/(m+n) \le 0.6$, preferably such that $0 < n/(m+n) \le 0.6$, and more preferably such that $0 < n/(m+n) \le 0.4$. When m+n is less than 5.0, the physical properties of the silicone composition decrease; when m+n exceeds 100, the extensibility of the silicone composition is poor. Also, when n/(m+n) exceeds 0.6, the strength of the cured composition decreases. It is desirable for n and m to fall within the above ranges. Although not particularly limited, it is preferable for $1<n<28$, and more preferable for $1<n<20$, and it is preferable for $6<m<50$, and more preferable for $10<m<50$.

The content of component (C) in the overall silicone composition is such that the ratio expressed as (total number of SiH groups)/(total number of silicon-bonded aliphatic unsaturated hydrocarbon groups) is preferably in the range of 0.5 to 3.0, and more preferably from 1.5 to 2.5. Specifically, the ratio expressed as (total number of SiH groups (C) in component (C))/(total number of silicon-bonded aliphatic unsaturated hydrocarbon groups in components (A) and (B)) is preferably in the range of 0.5 to 3.0, and more preferably from 1.5 to 2.5. Cases in which component (F) and component (H) are included as optional ingredients will be described later in this specification.

[Component (D)]

Component (D) is an organic peroxide having a ten hour half-life temperature of at least 40° C. One such organic peroxide may be used alone or two or more may be used in suitable combination. Organic peroxides that may be used in this invention are not particularly limited, provided that they crosslink components (A), (B) and (C) by way of radical reactions, and are exemplified by ketone peroxides, hydroperoxides, diacyl peroxides, dialkyl peroxides, peroxyketals, alkyl peresters and percarbonates. Taking into account the temperature at which the silicone composition is to be heat cured and the shelf stability of the composition, this organic peroxide is one which has a ten hour half-life temperature of at least 40° C., preferably at least 50° C., more preferably at least 60° C., and even more preferably at least 65° C. When the ten hour half-life temperature is too low, it is difficult to fully ensure the shelf stability of the composition. There is no particular upper limit, although the ten hour half-life temperature is generally 200° C. or less.

The component (D) content, based on the balance between the shelf stability and curability of the silicone composition, is from 0.01 to 10 parts by weight, preferably from 0.1 to 5 parts by weight, and more preferably from 0.3 to 5 parts by weight, per 100 parts by weight of compounds (A) and (B) combined. The reason is that, at a component (D) content below 0.01 part by weight, the bond strength is low; on the other hand, adding more than 10 parts by weight does not further improve the bond strength and is uneconomical. Regarding the method by which component (D) is added, it may be added directly as is, or it may be added after first being rendered into a solution or paste.

[Component (E)]

Component (E) is a heat-conductive filler having a thermal conductivity that is at least 10 W/(m·° C.) [W/(m·K)]. The filler is not particularly limited, provided that the thermal conductivity is at least 10 W/(m·° C.). One such filler may be used alone or two or more may be used in suitable combination. The heat-conductive filler of component (E) has a thermal conductivity of at least 10 W/(m·° C.), and preferably at least 15 W/(m·° C.). The reason is that when the thermal conductivity of the filler is less than 10 W/(m·° C.), the heat-conductive silicone composition itself has a small thermal conductivity. Although there is no particular upper limit, the filler may have a thermal conductivity of up to 2,000 W/(m·° C.). Examples of such heat-conductive fillers include aluminum powder, copper powder, silver powder, iron powder, nickel powder, gold power, tin powder, metallic silicon powder, aluminum nitride powder, boron nitride powder, aluminum oxide (alumina) powder, diamond powder, carbon powder, indium powder, gallium powder and zinc oxide powder. Of these, zinc oxide and aluminum powder are preferred; combinations of these are even more preferred.

Component (E) has an average particle size that is preferably in the range of 0.1 to 100 μm, and more preferably from 0.1 to 90 μm. When the average particle size is less than 0.1 μm, the resulting silicone composition is not uniform and so the extensibility may be poor; when it exceeds 100 μm, the thermal resistance of the silicone composition becomes large and the performance may decline. In this invention, the average particle size is the volume mean diameter (median diameter D50) obtained by laser diffraction/scattering particle size distribution measurement. The instrument used may be the Microtrac MT-3300EX (Nikkiso Co., Ltd.). The particle shape of component (E) may be amorphous, spherical or any other shape.

The content of component (E) per 100 parts by weight of the combined amount of components (A) and (B) is from 100 to 3,000 parts by weight, preferably from 200 to 1,800 parts by weight, and more preferably from 400 to 1,800 parts by weight. At a component (E) content below this lower limit, the resulting composition has a poor thermal conductivity; at a content that exceeds the upper limit, the silicone composition has a poor extensibility.

[Component (F)]

The silicone composition of the invention, from the standpoint of wettability with the heat-conductive filler and imparting adhesiveness to the silicone composition, preferably includes a hydrolyzable organopolysiloxane of structural formula (2) below. Component (F) may be of one type used alone or two or more may be used in suitable combination.

[Chem. 5]

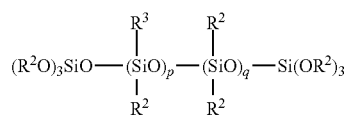

(2)

In the formula, each $R^2$ is independently an alkyl group of 1 to 6 carbon atoms, $R^3$ is an alkenyl group of 2 to 6 carbon atoms, and p and q are numbers which satisfy the condition $5.0 \leq p+q \leq 100$.

Each $R^2$ is independently an alkyl group of 1 to 6 carbon atoms, examples of which include methyl, ethyl, propyl, isopropyl, butyl, sec-butyl, tert-butyl, pentyl and hexyl groups. $R^3$ is an alkenyl group of 2 to 6 carbon atoms, examples of which include vinyl, allyl, propenyl, isopropenyl, butenyl, hexenyl and cyclohexenyl groups.

The subscripts "p" and "q" are numbers which satisfy the condition $5.0 \leq p+q \leq 100$, and preferably $5.0 \leq p+q \leq 60$. When p+q is less than 5.0, oil bleeding from the silicone composition may become severe. On the other hand, when p+q is larger than 100, the wettability with the filler may be inadequate. The subscripts "p" and "q" preferably satisfy the condition $1 \leq p \leq 5$ and $4 \leq q \leq 60$.

In cases where component (F) is included, the content thereof per 100 parts by weight of components (A) and (B) combined is preferably from 1 to 50 parts by weight, and more preferably from 1 to 20 parts by weight. When the content of component (F) is below this lower limit, it may not be possible to elicit sufficient wettability and adhesiveness. On the other hand, when the content of component (F) exceeds this upper limit, bleeding from the silicone composition may become severe.

[Component (G)]

The silicone composition of the invention may additionally include (G) a hydrolyzable organopolysiloxane of general formula (3) below

[Chem. 6]

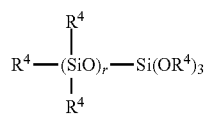

(3)

(wherein each $R^4$ is independently an alkyl group of 1 to 6 carbon atoms, and r is an integer from 5 to 100). Component (G) may be of one type used alone or two or more may be used in suitable combination.

Each $R^4$ is independently an alkyl group of 1 to 6 carbon atoms. Examples include methyl, ethyl, propyl, isopropyl, butyl, sec-butyl, tert-butyl, pentyl and hexyl groups. The subscript "r" is an integer from 5 to 100, and preferably an integer from 10 to 60. When the value of r is less than 5, oil bleeding from the silicone composition may become severe. On the other hand, when the value of r exceeds the upper limit, the wettability with the filler may become inadequate.

In cases where component (G) is included, the content thereof per 100 parts by weight of components (A) and (B) combined is preferably from 1 to 50 parts by weight, and more preferably from 1 to 30 parts by weight. When the content of component (G) is below this lower limit, it may not be possible to exhibit a sufficient wettability. On the other hand, when the content of component (G) exceeds this upper limit, bleeding from the silicone composition may become severe.

[Component (H)]

The silicone composition of the invention may additionally include (H) an organohydrogenpolysiloxane having at least one functional group selected from epoxy groups, (meth)acryloxy groups, alkoxysilyl groups and carbonyl groups. Component (H) may be one such organohydrogenpolysiloxane used alone or two or more may be used in suitable combination. By including component (H), the adhesiveness of the silicone composition can be further enhanced. Component (H) is exemplified by organohydrogenpolysiloxanes of general formula (4) below.

[Chem. 7]

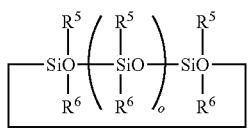

(4)

In the formula, each $R^5$ is independently a group selected from epoxy, acryloyl, methacryloyl, ether and trialkoxysilyl groups bonded to a silicon atom through a carbon or oxygen atom, or is a hydrogen atom, with the proviso that two or three of the groups represented by $R^5$ are hydrogen atoms. Each $R^6$ is independently an alkyl group of 1 to 6 carbon atoms, and the subscript "o" is an integer from 2 to 8.

Each $R^6$ is independently an alkyl group of 1 to 6 carbon atoms, examples of which methyl, ethyl, propyl, isopropyl, butyl, sec-butyl, tert-butyl, pentyl and hexyl groups.

In cases where component (F) and component (H) are included, the combined amount of the organohydrogenpolysiloxanes of components (C) and (H) relative to the overall silicone composition is preferably such that the ratio (total number of SiH groups)/(total number of silicon-bonded aliphatic unsaturated hydrocarbon groups) is in the range of 0.5 to 3.0, and more preferably such that this ratio is from 1.5 to 2.5. Specifically, an amount such that the ratio (total number of SiH groups in components (C) and (H))/(total number of silicon-bonded aliphatic unsaturated hydrocarbon groups in components (A), (B) and (F)) falls in the range of 0.5 to 3.0 is preferred, and an amount such that this ratio is from 1.5 to 2.5 is more preferred. When the amount of components (C) and (H) is less than 0.5, sufficient adhesiveness may not be exhibited and so adherence to the substrate may worsen. When it exceeds 3.0, unreacted SiH groups may trigger surplus crosslinking reactions and the hardness of the cured composition may rise. Also, an amount such that the ratio (number of SiH groups in component (C))/(number of SiH groups in components (C) and (H)) is from 0.3 to 0.7 is preferred. When the ratio (number of SiH groups in component (C))/(number of SiH groups in components (C) and (H)) is less than 0.3, the physical properties of the silicone composition may decrease; when it exceeds 0.7, a sufficient adhesiveness may not be exhibited and so adherence to the substrate may worsen.

[Component (I)]

Component (I) is a platinum group metal catalyst and functions to promote the above-described addition reactions. Hitherto known platinum group metal catalysts that are used in addition reactions may be used as the platinum group metal catalyst. Component (I) may be one such catalyst used alone or two or more may be used in suitable combination. Component (I) is exemplified by platinum-based, palladium-based and rhodium-based catalysts. Of these, relatively easily available platinum or platinum compounds are preferred, examples of which include uncombined platinum, platinum black, chloroplatinic acid, platinum-olefin complexes, platinum-alcohol complexes and platinum coordination compounds.

In cases where component (I) is included, the content thereof should be an amount that is effective as a catalyst; that is, an effective amount required to promote the addition reactions and cure the inventive composition. In terms of weight based on the platinum group metal atoms, the amount relative to the combined weight of components (A) and (B) is preferably from 0.1 to 500 ppm, and more preferably from 1 to 200 ppm. At an amount of catalyst below the lower limit, the effect as a catalyst may not be obtainable. On the other hand, an amount in excess of the upper limit is undesirable because it does not result in a further increase in the catalytic effects and is uneconomical.

[Component (J)]

The silicone composition of the invention may further include (J) a reaction regulator in order to keep the hydrosilylation reaction from proceeding at room temperature and thereby prolong the shelf life and pot life. Component (J) may be one such reaction regulator used alone or two or more may be used in suitable combination. Hitherto known reaction regulators that are used in addition-curable silicone compositions may be used here as the reaction regulator. Examples include acetylene alcohols (e.g., ethynylmethyldecylcarbinol, 1-ethynyl-1-cyclohexanol and 3,5-dimethyl-1-hexyn-3-ol), various nitrogen compounds such as tributylamine, tetramethylethylenediamine and benzotriazole, organophosphorus compounds such as triphenylphosphine, oxime compounds and organochlorine compounds.

When component (J) is included, the content thereof per 100 parts by weight of components (A) and (B) combined is preferably from 0.05 to 5.0 parts by weight, and more preferably from 0.1 to 2.0 parts by weight. When the amount of reaction regulator is less than 0.05 part by weight, the sufficient shelf life and pot life that are desired may not be obtainable; on the other hand, when it exceeds 5.0 parts by weight, the curability of the silicone composition may decrease. To provide the reaction regulator with a good dispersibility in the silicone composition, it may be used after dilution with an organo(poly)siloxane, toluene or the like.

[Other Ingredients]

The silicone composition of the invention may further include an organo(poly)siloxane that does not have reactivity with methylpolysiloxane, etc. in order to adjust the elastic modulus and viscosity of the silicone composition. In addition, to prevent deterioration of the silicone composition, an antioxidant known to the art, such as 2,6-di-t-butyl-4-methylphenol, may be optionally included. Also, dyes, pigments, flame retardants, sedimentation inhibitors, thixotropy modifiers and the like may be optionally included in suitable amounts for each.

[Method for Producing the Silicone Composition]

The method for producing the silicone composition of the invention is not particularly limited, so long as it accords with methods for preparing conventional silicone compositions. The method includes steps for preparing a silicone composition which contains above components (A) to (E), and optionally contains also components (F) to (J) and other ingredients. For example, production may be carried out by a method that mixes together components (A) to (E) and also, where necessary, components (F) to (J) and other ingredients using a mixer such as the Trimix, Twinmix or Planetary Mixer (all registered trademarks of mixers manufactured by Inoue Mfg., Inc.), the Ultra Mixer (registered trademark of mixers manufactured by Mizuho Industrial Co., Ltd.) or the HIVIS DISPER MIX (registered trademark of mixers manufactured by Tokushu Kika Kogyo KK).

[Properties of Silicone Composition]

The silicone composition of the invention has an absolute viscosity measured at 25° C. which is preferably from 3.0 to 500 Pa·s, and more preferably from 10 to 400 Pa·s. At an absolute viscosity below 3.0 Pa·s, shape retention may become difficult and the workability may worsen in other respects as well. In cases too where the absolute viscosity exceeds 500 Pa·s, discharge may become difficult and the workability may worsen in other respects as well. The absolute viscosity range of the invention can be obtained by adjustments in the compounding of the ingredients. In this invention, the absolute viscosity is the value measured at 25° C. with a spiral viscometer, such as the PC-IT spiral viscometer from Malcolm Co., Ltd. (10 rpm with rotor A; shear rate, 6 s$^{-1}$).

The silicone composition has a thermal conductivity that is preferably at least 0.5 W/(m·° C.). There is no particular upper limit, although this value may be set to 30 W/(m·° C.) or less.

The silicone composition of the invention may be placed between an electronic component (e.g., a LSI chip) or other heat-generating member and a cooling member, and favorably used for heat dissipation by conducting heat from the heat-generating member to the cooling member. It can be used in the same way as conventional heat-conductive silicone compositions. For example, the silicone composition of the invention can be cured by heat generated from a heat-generating member such as an electronic component. Alternatively, the silicone composition of the invention may be applied and then deliberately heat-cured. A semiconductor device in which the cured form of the inventive silicone composition has been placed between a heat-generating member and a cooling member can thus be provided. The curing conditions when heat-curing the silicone composition of the invention, although not particularly limited, are typically between 80 and 200° C., preferably between 100 and 180° C., and from 30 minutes to 4 hours, preferably from 30 minutes to 2 hours. Because the silicone composition of the invention has a high thermal conductivity and a good adhesiveness, it is especially well-suited for use as a heat-dissipating material for advanced semiconductor devices.

The cured form of the silicone composition has a bond strength of preferably at least 150 N, and more preferably at least 200 N. At less than 150 N, it may be unable to conform to warping and other changes in the electronic component and may end up delaminating. Although there is no particular upper limit, the bond strength may be set to up to 500 N. The method for measuring the bond strength is described in the "Examples" section below.

EXAMPLES

The invention is illustrated concretely below by way of Examples and Comparative Examples, although the invention is not limited by these Examples. The invention is explained in greater detail below by way of Examples and Comparative Examples, although the invention is not limited by these Examples.

The ingredients are described. The kinematic viscosities mentioned below are values measured at 25° C. with an Ubbelohde-type Ostwald viscometer (Sibata Scientific Technology Ltd.).

[Component (A)]

A-1: Dimethylpolysiloxane capped at both ends with dimethylvinylsiloxy groups and having a kinematic viscosity at 25° C. of 600 mm$^2$/s A-2: Dimethylpolysiloxane capped at both ends with dimethylvinylsiloxy groups and having a kinematic viscosity at 25° C. of 10,000 mm$^2$/s

[Component (B)]

B-1: Silicone resin of the average compositional formula below: kinematic viscosity of 50 wt % solution in xylene solvent, 3.0 mm$^2$/s

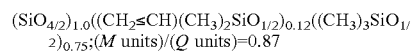

$(SiO_{4/2})_{1.0}((CH_2=CH)(CH_3)_2SiO_{1/2})_{0.12}((CH_3)_3SiO_{1/2})_{0.75}$; (M units)/(Q units)=0.87

B-2: Silicone resin of the average compositional formula below: kinematic viscosity of 50 wt % solution in xylene solvent, 1.5 mm$^2$/s

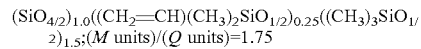

$(SiO_{4/2})_{1.0}((CH_2=CH)(CH_3)_2SiO_{1/2})_{0.25}((CH_3)_3SiO_{1/2})_{1.5}$; (M units)/(Q units)=1.75

[Component (C)]

Ingredients of the following structural formulas

[Chem. 8]

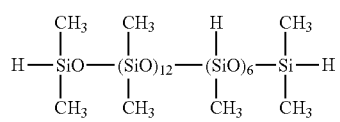

C-1

In formula (1), m+n=18 and n/(m+n)=0.33.

[Chem. 9]

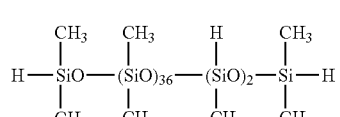

C-2

In formula (1), m+n=38 and n/(m+n)=0.05.

[Chem. 10]

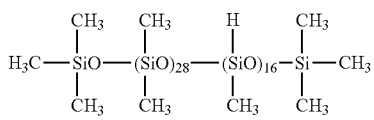

C-3

In formula (1), m+n=44 and n/(m+n)=0.36.

[Component (D)]

D-1: The dialkyl peroxide of the following formula. Available as Kayahexa AD from Kayaku Akzo Corporation; ten hour half-life temperature, 118° C.

[Chem. 11]

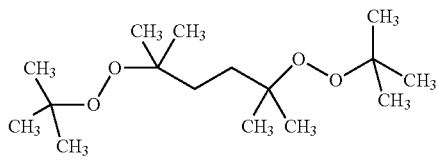

D-2: The diacyl peroxide of the following formula. Available as Perkadox PM-50S-PS from Kayaku Akzo Corporation; ten hour half-life temperature, 71° C.

[Chem. 12]

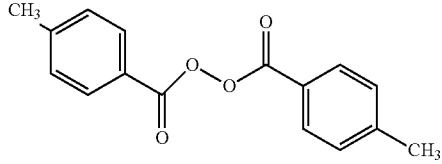

[Component (E)]

E-1: An aluminum powder obtained by premixing an aluminum powder having an average particle size of 20.0 μm with an aluminum powder having an average particle size of 2.0 μm in a 60:40 weight ratio (thermal conductivity, 237 W/(m·° C.))

E-2: A zinc oxide powder having an average particle size of 1.0 μm (thermal conductivity, 25 W/(m·° C.))

[Component (F)]

F-1: An ingredient of the following structural formula

[Chem. 13]

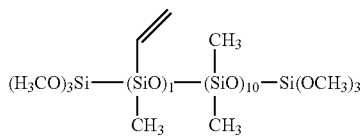

[Component (G)]

G-1: An ingredient of the following structural formula

[Chem. 14]

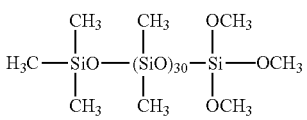

[Component (H)]

H-1: An ingredient of the following structural formula

[Chem. 15]

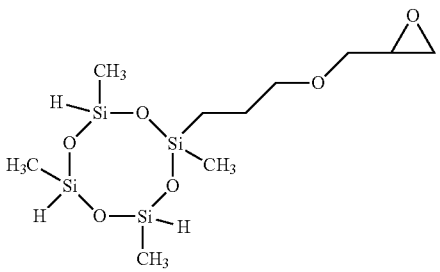

H-2: An ingredient of the following structural formula

[Chem. 16]

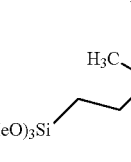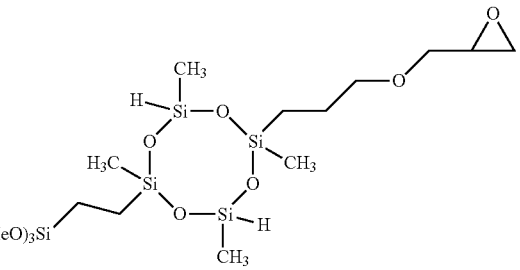

(wherein Me represents a methyl group)

[Component (I)]

I-1: A solution obtained by dissolving a platinum-divinyltetramethyldisiloxane complex in the same dimethylpolysiloxane as A-1 above (platinum atom content, 1 wt %)

[Component (J)]

J-1: An ingredient of the following formula

[Chem. 17]

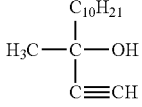

Examples 1 to 21, Comparative Examples 1 to 4

<Preparation of Silicone Composition>

Silicone compositions were prepared by using the following method to blend together components (A) to (J) in the amounts shown in Tables 1 to 3 below. In Table 1, the weight of component (I) is the weight of the solution obtained by dissolving a platinum-divinyltetramethyldisiloxane complex in dimethylpolysiloxane (platinum atom content, 1 wt %). SiH/SiVi is the ratio of the total number of SiH groups in components (C) and (H) to the total number of alkenyl groups in components (A), (B) and (F). Also, (C)SiH/((C)SiH+(H)SiH) is the ratio of the number of SiH groups in component (C) to the total number of SiH groups in components (C) and (H).

Components (A), (B), (E), (F) and (G) were added to a 5-liter planetary mixer (Inoue Mfg., Inc.) and mixed at 170° C. for 1 hour. The mixture was cooled to room temperature, following which components (C), (D), (H), (I) and (J) were added and mixing was carried out to uniformity, thereby giving the silicone composition.

The viscosity, coefficient of thermal conductivity, elongation at break and bond strength for each of the compositions obtained as described above were measured by the following methods. The results are presented in Tables 1 to 3.

[Viscosity]

The absolute viscosity of the silicone composition was measured at 25° C. using the PC-1T spiral viscometer from Malcolm Co., Ltd.

[Thermal Conductivity]

Each composition was wrapped in kitchen wrap, and the thermal conductivity was measured with the TPA-501 from Kyoto Electronics Manufacturing Co., Ltd.

[Elongation at Break]

Each composition was cured by heating at 150° C. for 60 minutes so as to produce a 2 mm thick sheet, following which, in general accordance with JIS K6251, No. 2 dumbbell specimens were fabricated and the elongation at break was measured.

[Bond Strength]

Each composition was sandwiched between a silicon wafer attached onto die-cast aluminum and nickel-plated copper, and was heated at 150° C. for 60 minutes while pressure was applied with 20 psi grips. The bond strength was then measured by pushing in and peeling with a Shimadzu Autograph.

TABLE 1

| | Formulation (pbw) | 1 | 2 | 3 | 4 | 5 | 6 | 7 | 8 | 9 | 10 | 11 |
|---|---|---|---|---|---|---|---|---|---|---|---|---|
| (A) | A-1 | 90 | 0 | 80 | 95 | 90 | 90 | 90 | 90 | 90 | 90 | 90 |
| | A-2 | 0 | 90 | 0 | 0 | 0 | 0 | 0 | 0 | 0 | 0 | 0 |
| (B) | B-1 | 10 | 10 | 20 | 5 | 0 | 10 | 10 | 10 | 10 | 10 | 10 |
| | B-2 | 0 | 0 | 0 | 0 | 10 | 0 | 0 | 0 | 0 | 0 | 0 |
| (C) | C-1 | 3.2 | 3.2 | 3.6 | 2.7 | 3.2 | 0 | 0 | 3.2 | 3.2 | 3.2 | 6.0 |
| | C-2 | 0 | 0 | 0 | 0 | 0 | 17.4 | 0 | 0 | 0 | 0 | 0 |
| | C-3 | 0 | 0 | 0 | 0 | 0 | 0 | 3.2 | 0 | 0 | 0 | 0 |
| (D) | D-1 | 1.0 | 1.0 | 1.0 | 1.0 | 1.0 | 1.0 | 1.0 | 0.5 | 0 | 1.0 | 1.0 |
| | D-2 | 0 | 0 | 0 | 0 | 0 | 0 | 0 | 0 | 1.0 | 0 | 0 |
| (E) | E-1 | 560 | 560 | 560 | 560 | 560 | 560 | 560 | 560 | 560 | 330 | 1,427 |
| | E-2 | 124 | 124 | 124 | 124 | 124 | 124 | 124 | 124 | 124 | 73 | 327 |
| | Total amount of filler (E) | 684 | 684 | 684 | 684 | 684 | 684 | 684 | 684 | 684 | 403 | 1,754 |
| (F) | F-1 | 3 | 3 | 3 | 3 | 3 | 3 | 3 | 3 | 3 | 3 | 20 |
| (G) | G-1 | 8 | 8 | 8 | 8 | 8 | 8 | 8 | 8 | 8 | 8 | 50 |
| (H) | H-1 | 2.1 | 2.1 | 2.4 | 1.9 | 2.1 | 2.1 | 2.1 | 2.1 | 2.1 | 2.1 | 3.9 |
| | H-2 | 0 | 0 | 0 | 0 | 0 | 0 | 0 | 0 | 0 | 0 | 0 |
| (I) | I-1 | 0.35 | 0.35 | 0.35 | 0.35 | 0.35 | 0.35 | 0.35 | 0.35 | 0.35 | 0.35 | 0.35 |
| (J) | J-1 | 0.8 | 0.8 | 0.8 | 0.8 | 0.8 | 0.8 | 0.8 | 0.8 | 0.8 | 0.8 | 0.8 |
| | Si—H/Si-Vi | 1.65 | 1.65 | 1.65 | 1.65 | 1.65 | 1.65 | 1.65 | 1.65 | 1.65 | 1.65 | 1.65 |
| | (C)Si—H/((C)Si—H + (H)Si—H) | 0.5 | 0.5 | 0.5 | 0.5 | 0.5 | 0.5 | 0.5 | 0.5 | 0.5 | 0.5 | 0.5 |
| Evaluation results | Absolute viscosity (Pa · s) | 51 | 352 | 307 | 34 | 42 | 45 | 53 | 54 | 53 | 19 | 370 |
| | Thermal conductivity (W/(m · ° C.)) | 2.5 | 2.5 | 2.5 | 2.5 | 2.5 | 2.2 | 2.6 | 2.6 | 2.6 | 0.7 | 4.8 |
| | Elongation at break (%) | 27 | 70 | 22 | 42 | 30 | 60 | 36 | 38 | 24 | 24 | 12 |
| | Bond strength (N) | 250 | 244 | 246 | 216 | 248 | 238 | 244 | 212 | 221 | 311 | 224 |

TABLE 2

| | Formulation (pbw) | 12 | 13 | 14 | 15 | 16 | 17 | 18 | 19 | 20 | 21 |
|---|---|---|---|---|---|---|---|---|---|---|---|
| (A) | A-1 | 90 | 90 | 90 | 90 | 90 | 90 | 90 | 90 | 90 | 90 |
| (B) | B-1 | 10 | 10 | 10 | 10 | 10 | 10 | 10 | 10 | 10 | 10 |
| (C) | C-1 | 3.2 | 2.9 | 1.9 | 4.6 | 3.2 | 3.2 | 3.2 | 3.9 | 4.8 | 3.2 |
| (D) | D-1 | 2.0 | 1.0 | 1.0 | 1.0 | 1.0 | 1.0 | 1.0 | 1.0 | 1.0 | 1.0 |
| (E) | E-1 | 560 | 560 | 560 | 560 | 560 | 560 | 551 | 550 | 550 | 560 |
| | E-2 | 124 | 124 | 124 | 124 | 124 | 124 | 121 | 120 | 120 | 124 |
| | Total amount of filler (E) | 684 | 684 | 684 | 684 | 684 | 684 | 672 | 670 | 670 | 684 |
| (F) | F-1 | 3.0 | 3.0 | 3.0 | 3.0 | 3.0 | 2.5 | 2.5 | 2.5 | 2.5 | 3.0 |
| (G) | G-1 | 8 | 8 | 8 | 8 | 8 | 7 | 6 | 6 | 6 | 8 |
| (H) | H-1 | 2.1 | 1.9 | 2.6 | 1.2 | 0 | 2.1 | 2.1 | 2.4 | 3.0 | 2.1 |
| | H-2 | 0 | 0 | 0 | 0 | 5.8 | 0 | 0 | 0 | 0 | 0 |

TABLE 2-continued

| | Formulation (pbw) | 12 | 13 | 14 | 15 | 16 | 17 | 18 | 19 | 20 | 21 |
|---|---|---|---|---|---|---|---|---|---|---|---|
| (I) | I-1 | 0.35 | 0.35 | 0.35 | 0.35 | 0.35 | 0.35 | 0.24 | 0.24 | 0.24 | 0 |
| (J) | J-1 | 0.8 | 0.8 | 0.8 | 0.8 | 0.8 | 0.8 | 0.8 | 1.0 | 1.0 | 0 |
| | Si—H/Si-Vi | 1.65 | 1.5 | 1.65 | 1.65 | 1.65 | 1.7 | 1.7 | 2.0 | 2.5 | 1.65 |
| (C)Si—H/((C)Si—H + (H)Si—H) | | 0.5 | 0.5 | 0.5 | 0.7 | 0.5 | 0.5 | 0.5 | 0.5 | 0.5 | 0.5 |
| Evaluation results | Absolute viscosity (Pa · s) | 64 | 53 | 85 | 42 | 81 | 74 | 90 | 73 | 71 | 69 |
| | Thermal conductivity (W/(m · ° C.)) | 2.5 | 2.6 | 2.5 | 2.5 | 2.1 | 2.5 | 2.5 | 2.4 | 2.3 | 2.6 |
| | Elongation at break (%) | 29 | 21 | 52 | 48 | 40 | 46 | 47 | 44 | 48 | 28 |
| | Bond strength (N) | 232 | 235 | 217 | 227 | 251 | 238 | 277 | 291 | 269 | 274 |

TABLE 3

| | | Comparative Example | | | |
|---|---|---|---|---|---|
| | Formulation (pbw) | 1 | 2 | 3 | 4 |
| (A) | A-1 | 90 | 40 | 90 | 100 |
| (B) | B-1 | 10 | 60 | 10 | 0 |
| (C) | C-1 | 3.2 | 3.2 | 3.2 | 2.8 |
| (D) | D-1 | 0 | 1.0 | 1.0 | 1.0 |
| (E) | E-1 | 560 | 560 | 2,540 | 560 |
| | E-2 | 124 | 124 | 472 | 124 |
| | Total amount of filler (E) | 684 | 684 | 3,012 | 684 |
| (F) | F-1 | 3 | 3 | 3 | 3 |
| (G) | G-1 | 8 | 8 | 8 | 8 |
| (H) | H-1 | 2.1 | 2.1 | 2.1 | 1.8 |
| (I) | I-1 | 0.35 | 0.35 | 0.35 | 0.35 |
| (J) | J-1 | 0.8 | 0.8 | 0.8 | 0.8 |
| | Si—H/Si-Vi | 1.65 | 1.65 | 1.65 | 1.65 |
| (C)Si—H/((C)Si—H + (H)Si—H) | | 0.5 | 0.5 | 0.5 | 0.5 |
| Evaluation results | Absolute viscosity (Pa · s) | 70 | composition did not become uniform | composition did not become uniform | 39 |
| | Thermal conductivity (W/(m · ° C.)) | 2.5 | | | 2.6 |
| | Elongation at break (%) | 32 | | | 48 |
| | Bond strength (N) | 138 | | | 125 |

It is apparent from the results in Tables 1 to 3 that, in Examples 1 to 21 which satisfy the conditions of the invention, in contrast with Comparative Examples 1 to 4, the bond strength of the silicone composition was large. In cases where the silicone compositions of the invention were used for firmly bonding together a semiconductor chip and a heat spreader, the compositions were confirmed to have a good adhesiveness even when they included a large amount of heat-conductive filler. On the other hand, in Comparative Example 1 which did not include component (D), the bond strength of the composition was low. Also, in Comparative Example 2 in which the amount of component (B) per 100 parts by weight of the combined amount of components (A) and (B) was high at 60 parts by weight, and in Comparative Example 3 in which the amount of component (E) per 100 parts by weight of the combined amount of components (A) and (B) was high at 3,012 parts by weight, the composition did not become uniform (did not become creamy). In Comparative Example 4 which did not include component (B), the bond strength of the composition decreased.

The invention claimed is:
1. A silicone composition comprising:
(A) 50 to 99.9 parts by weight of an organopolysiloxane having at least two aliphatic unsaturated hydrocarbon groups per molecule and a kinematic viscosity at 25° C. of from 60 to 100,000 mm$^2$/s,
(B) 0.1 to 50 parts by weight of a silicone resin having at least one aliphatic unsaturated hydrocarbon group per molecule (with the proviso that the combined amount of components (A) and (B) is 100 parts by weight)
(C) an organohydrogenpolysiloxane of structural formula (1) below

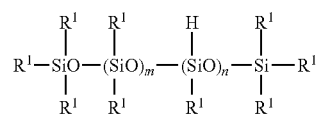

(1)

wherein each $R^1$ is independently an alkyl group of 1 to 6 carbon atoms or a hydrogen atom, and m and n are numbers which satisfy the conditions $5.0 \leq m+n \leq 100$ and $n/(m+n) \leq 0.6$, with the proviso that the molecule has a SiH group and the $R^1$ groups are not all hydrogen atoms,
(D) an organic peroxide having a ten hour half-life temperature of at least 40° C., in an amount of from 0.01 to 10 parts by weight per 100 parts by weight of components (A) and (B) combined, and (E) a heat-conductive filler having a thermal conductivity of at least 10 W/(m° C.), in an amount of from 100 to 3,000 parts by weight per 100 parts by weight of components (A) and (B) combined.

2. The silicone composition of claim 1, further comprising (F) a hydrolyzable organopolysiloxane of structural formula (2) below

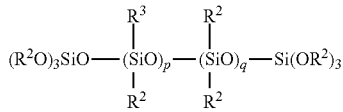

(2)

wherein each $R^2$ is independently an alkyl group of 1 to 6 carbon atoms, $R^3$ is an alkenyl group of 2 to 6 carbon atoms, and p and q are numbers which satisfy the condition $5.0 \leq p+q \leq 100$, in an amount of from 1 to 50 parts by weight per 100 parts by weight of components (A) and (B) combined.

3. The silicone composition of claim 1, further comprising (G) a hydrolyzable organopolysiloxane of general formula (3) below

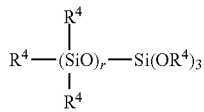

(3)

wherein each $R^4$ is independently an alkyl group of 1 to 6 carbon atoms, and r is an integer from 5 to 100, in an amount of from 1 to 50 parts by weight per 100 parts by weight of components (A) and (B) combined.

4. The silicone composition of claim 1, further comprising (H) an organohydrogenpolysiloxane having at least one functional group selected from epoxy groups, (meth)acryloxy groups, alkoxysilyl groups and carbonyl groups.

5. The silicone composition of claim 1, further comprising (I) an effective amount of a platinum group metal catalyst and (J) a reaction regulator in an amount of from 0.05 to 5.0 parts by weight per 100 parts by weight of components (A) and (B) combined.

* * * * *